(12) United States Patent
Dukhin et al.

(10) Patent No.: US 8,281,662 B2
(45) Date of Patent: Oct. 9, 2012

(54) METHOD FOR DETERMINING POROSITY, PORE SIZE AND ZETA POTENTIAL OF POROUS BODIES

(75) Inventors: Andrei Dukhin, Bedford Hills, NY (US); Philip J. Goetz, Bedford Hill, NY (US); Matthias Thommes, Boynton Beach, FL (US)

(73) Assignee: Dispersion Technology, Inc., Bedford Hills, NY (US)

( * ) Notice: Subject to any disclaimer, the term of this patent is extended or adjusted under 35 U.S.C. 154(b) by 0 days.

(21) Appl. No.: 12/587,877

(22) Filed: Oct. 15, 2009

(65) Prior Publication Data

US 2011/0283800 A1  Nov. 24, 2011

(51) Int. Cl.
  *G01H 3/00*  (2006.01)
(52) U.S. Cl. .......................................... 73/647
(58) Field of Classification Search .................. None
  See application file for complete search history.

(56) References Cited

U.S. PATENT DOCUMENTS

| | | | | |
|---|---|---|---|---|
| 6,449,563 | B1 * | 9/2002 | Dukhin et al. | 702/22 |
| 7,368,053 | B2 * | 5/2008 | Chuang et al. | 210/85 |
| 2005/0178702 | A1 * | 8/2005 | Chuang et al. | 210/85 |
| 2010/0254218 | A1 * | 10/2010 | Dorovsky et al. | 367/38 |

OTHER PUBLICATIONS

Electroseismic and seismoelectric measurements of rock samples in a water tank Zhenya Zhu, M. Nafi Toksoz, and Daniel R. Burns, Geophysics 73, E153 (2008), DOI:10.1190/1.2952570.*

* cited by examiner

*Primary Examiner* — Hezron E Williams
*Assistant Examiner* — Mark A. Shabman

(57) ABSTRACT

Propagation of ultrasound through a porous body saturated with liquid generates electric response. This electro-acoustic effect is called "seismoelectric current", whereas reverse version, when electric field is driving force, is "electroseismic current". It is possible to measure seismoelectric current with existing electro-acoustic devices, which had been designed for characterizing liquid dispersions. Such versatility allows calibration of said devise using dispersion and then applying it for characterizing porous body. In general, magnitude of seismoelectric current depends on porosity, pore size, zeta potential of pore surfaces and elastic properties of matrix. It is possible to adjust conductivity of liquid for simplifying these dependences. For instance, liquid with high ionic strength causes double layers become thin comparing to the pore size, which eliminates dependence of said currents on pore size. We suggest using such case for characterizing porosity. Magnitude of the said currents is proportional to zeta potential. This parameter can be calculated when porosity is known. In contrary, saturation of porous body with low conducting liquid leads to complete overlap of double layers, which can be used for characterizing pore size. Phase of the said currents can be used for determining iso-electric point because it rotates 180 degrees when liquid composition varies through this point.

3 Claims, 9 Drawing Sheets

METHOD FOR DETERMINING POROSITY, PORE SIZE AND ZETA POTENTIAL OF POROUS BODIES

FIELD OF THE INVENTION

Characterization of porous bodies in terms of porosity, pore size and zeta potential

BACKGROUND OF THE INVENTION

This invention deals with a particular kind of heterogeneous system, which can be described as a porous body consisting of a continuous solid matrix with embedded pores that can be filled with either gas or liquid. According to S. Lowell et al, the spatial distribution between the solid matrix and pores can be characterized in terms of a porosity and pore size. According to J. Frenkel and M. A. Biot, the mechanical properties of such systems with respect to any applied oscillating stress depend primarily on the visco-elastic properties of the matrix. Lyklema notes that when such porous bodies are saturated with liquid, additional properties are then related to any surface charge on these pores, which in turn is commonly characterized by a zeta potential. Although methods exist for characterizing these mechanical and electrical properties, they all have limitations and call out for improvement.

For example, S. Lowell et al describe in details several methods for characterizing porosity and pore size. According to IUPAC pores are classified into three classes: micropores, pore size <2 nm; mesopores, pore size is between 2 and 50 nm; macropores, pore size >50 nm. Gas adsorption techniques are applied for micro- and mesopores analysis. Mercury porosimetry has been the standard technique for macropore analysis. Environmental concerns justify a search for alternative methods that might eliminate, or at least minimize, the use of this dangerous material.

Lyklema and a IUPAC Report describe a method for measuring the zeta potential of porous bodies using the method of streaming current/potential. However, this method is not applicable for characterizing $\zeta$-potential of small pores due to the low hydrodynamic permeability of these pores, and furthermore it is not suitable for simultaneously determining porosity and pore size.

There have been several attempts at developing ultrasound methods for characterizing porous bodies. A sound wave undergoes change as it propagates though a saturated porous body and, in the process, generates a host of secondary effects that can then be used for characterizing the properties of these bodies. To date, most attempts are associated with the measurement of sound speed and attenuation, the two main characteristics of ultrasound waves propagating through a visco-elastic media. These two parameters are easily measurable and, in principle, can serve as a source of information for calculating porosity and pore size. U.S. Pat. No. 6,684,701 issued Feb. 3, 2004, to Dubois et al describes a method for extracting porosity by comparing the measured attenuation spectra with that of predetermined standards. U.S. Pat. No. 6,745,628, issued Jun. 8, 2004, to Wunderer claims to measure porosity based on transmission measurements of ultrasonic waves in air, which might be possible only for very large pores comparable to the sound wavelength, which for proposed low frequency is perhaps several millimeters. Yet another U.S. Pat. No. 7,353,709, issued Apr. 8, 2008, to Kruger et al., suggests some improvements in this method, but still relies on comparison with attenuation standards to extract the porosity information from the raw data. There are also several patents describing the use of ultrasound for characterizing the porous structure of bone. One example is U.S. Pat. No. 6,899,680, issued May 31, 2005, to Hoff et al. for estimating the shear wave velocity, but not attenuation. There are also two patents that utilize differences in sound speed between different propagation modes. The first is U.S. Pat. No. 5,804,727, issued Sep. 8, 1998, to Lu et al., that simply states that a person skilled in the art would recognize that velocities of different modes could be used for determining the physical properties of materials. The second, U.S. Pat. No. 6,959,602, issued Nov. 1, 2005, to Peterson et al., suggests that, based on a prediction by Biot, one might use the velocity of fast compression waves for calculating porosity and slow compression waves for detecting body defects.

However, analysis of the Biot theory raises many concerns about the efficacy of using ultrasound attenuation and sound speed for characterizing porous bodies. M. A. Biot in 1956, crediting the earlier work by J. Frenkel, developed a well-known general theory of sound propagation through wet porous bodies by including the following set of eleven physical properties to describe the solid matrix and liquid:
 1. density of sediment grains
 2. bulk modulus of grains
 3. density of pore fluid
 4. bulk modulus of pore fluid
 5. viscosity of pore fluid
 6. porosity
 7. pore size parameter
 8. dynamic permeability
 9. structure factor
 10. complex shear modulus of frame
 11. complex bulk modulus of frame Ogushwitz recognized that the last four of these properties present a big problem in applying Biot's theory and proposed several empirical and semi-empirical methods for estimating their value, but none of his suggestions are sufficiently general, and in some cases simply amount to a substitution of one property with another unknown constant. Barret-Gultepe et al also discuss this problem in their study of the compressibility of colloids, in which they speak of the importance of a "skeleton effect" and the difficulty of measuring the required input parameters independently.

This problem of unknown input parameters makes us skeptical of determining porosity and pore sizes from attenuation and sound speed. Furthermore, relying on attenuation and sound speed alone does not yield any information on the electric properties of porous bodies. However, the electric properties can be determined using ultrasound since sound generates electric signals as the sound wave propagates through the porous body by disturbing the electric double layer surrounding the pore surfaces. This effect is usually called the "seismo-electric phenomena" because it was first employed in the field of geological exploration. Ivanov first discovered the effect in 1940 and J. Frenkel developed the first relevant theory in 1944. Independently, M. Williams in 1948 discovered the same effect and later in 2007, A. Dukhin described this effect in a dispersion of structured carbon nano-tubes. Each used different names for essentially the same effect. Apparently, E. Muller et al. also observed this effect in chromatographic resins, but mistakenly interpreted it as a Colloid Vibration Current, as described in detail by A. Dukhin and P. Goetz. There is a host of papers on the observation of this seismo-electric effect in geology including M. G. Markov in 2004, Z. Zhu et al. in 2007 and 1999, S. R. Pride et al. in 1994 and 1996, M. W. Haarsten et al. in 1997, Mikhailov et al. in 2000, and A. Thomson et al. in 1993.

This high frequency effect is very close in nature to streaming current/potential, which is also the result of coupling between mechanical and electric fields. However, there is one large difference between this seismo-electric current and a streaming current. Streaming current is typically measured under steady state or very low frequency excitation. Consequently, it is an isochoric effect, which means that the liquid and the solid matrix are considered incompressible. In contrast, the seismo-electric effect is non-isochoric by its very nature. A relative motion of phases in pores occurs due to a difference in compressibility between the liquid and solid. This difference justifies using a new independent name for this effect. Seismo-electric and reverse electro-seismic effects belong to a family of electro-acoustic phenomena, which was described in some detail by A. S. Dukhin and P. J. Goetz in 2002. These phenomena are each associated with coupling between electric and ultrasound fields in heterogeneous systems. Nevertheless, there are many similarities between these effects, which is why an overview of streaming current/potential features is important part of this prior art discussion.

It is well known that a flow of liquid through a porous body generates an electric current or potential, depending on the method of measurement. This electric response occurs due to the motion of the ionic diffuse layers that screen the electric surface charge covering the pores. This motion would appear with an applied mechanical driving force at any frequency. However, the mechanism is quite different for a constant or low frequency driving force, as compared with high frequency excitation at several MHz or higher. This difference in applied frequency provides some justification for using two different terms for essentially the same electro-mechanical effect.

Historically, the first experimental observation of this coupling in porous bodies was made for a constant applied driving force. In the field of Colloid and Interface Science, this effect is known as streaming current or streaming potential. It is usually assumed that the gradient of the applied pressure is constant, time independent, and that the liquid is incompressible, which makes this an isochoric phenomenon. M. W. Kruyt in 1952, S. Dukhin et al. in 1974 and J. Lyklema in 2000 discuss many experimental and theoretical studies of this effect.

Streaming current/potential depends strongly on the distribution of the electric potential inside the pores $\Phi$. FIG. 1 illustrates possible space distributions of this potential including two extreme cases: (1) isolated thin double layer (DL) and (2) homogeneous completely overlapped double layers. There are analytical theories that describe the main features of this electro-kinetic effect for these two extreme cases.

M. Smoluchowski in 1903 was the first to develop the well-known theory for streaming current/potential for the case of isolated thin double layers. This theory yields the following expression for the electric potential difference $\Delta V$ generated by pressure difference $\Delta P$:

$$\Delta V = \frac{\varepsilon \varepsilon_0 \zeta}{\eta K_m} \Delta P \qquad (1)$$

where $\varepsilon$ and $\varepsilon_0$ are the dielectric permittivity of the liquid and vacuum, $\zeta$ is the electro-kinetic potential of the pore surface, $\eta$ is the dynamic viscosity of the liquid, and $K_m$ is the conductivity of the liquid.

This theory is valid when the capillary radius R is much larger then the DL thickness, $\kappa^{-1}$, i.e.:

$$\kappa R \gg 1 \qquad (2)$$

as illustrated by curve 1 on FIG. 1.

It is also assumed that surface conductivity associated with excess ions in the DL is negligible.

According to Smoluchowski theory, this effect offers little hope for studying porosity and pore size, since these parameters are simply absent in Eq. 1. This is an unfortunate result of the geometric similarity between the hydrodynamic and electric fields in the pores under conditions where Smoluchowski theory is valid. The introduction of surface conductivity would introduce some dependence on pore size, but even this is uncertain because of the unknown values for the surface conductivity.

Decreasing the pore size leads eventually to an overlap of the double layers, which is reflected as a transition from distribution 1 to distributions 3 on FIG. 1. Further decreasing of the pore size would cause complete overlap and the electric potential in the pore becomes constant. This is the case of the "thick" and "homogeneous" double layer, when:

$$\kappa R \ll 1 \qquad (3)$$

It is curious that the theory corresponding to this case of complete overlap was developed not in field of general Colloid Science but by scientists dealing with membrane phenomena, such as reverse osmosis and hyperfiltration. The reason for this is that condition (3) is valid in water only for very small pore size, which of course is the case for reverse osmosis membranes. This theory is made quite complex due to "concentration polarization", a phenomenon that occurs in sufficiently charged membranes when the number of counterions substantially exceeds the number of co-ions in the pores. This concentration polarization leads to a separation of ions at the pore entrance, which in turn generates a concentration gradient in front of pore. G. B. Tanny and E. Hoffer in 1973 developed a theory of streaming current/potential for the "homogeneous" case that takes into account this concentration polarization. We present here just the final expression to illustrate the complexity of this theory:

$$\frac{FE}{RT} = \frac{J_v f_{1w}^0}{\theta \varphi_w} \Delta x + \ln \frac{\tilde{c}_s'' + X}{\tilde{c}_s' + X} - \frac{1}{2} \ln \frac{\tilde{c}_s''^2 + \tilde{c}_s''(X - \tilde{c}_s'' \varphi_w) - \tilde{c}_s'' t_1 X \varphi_w}{\tilde{c}_s'^2 + \tilde{c}_s'(X - c_s'' \varphi_w) - \tilde{c}_s' t_1 X \varphi_w} + + \\ \frac{X + \tilde{c}_s'' \varphi_w (1 - 4t_2)}{2C} \ln \frac{\{2\tilde{c}_s'' + X - \tilde{c}_s'' \varphi_w - C\}\{2\tilde{c}_s' + X - \tilde{c}_s'' \varphi_w + C\}}{\{2\tilde{c}_s'' + X - \tilde{c}_s'' \varphi_w + C\}\{2\tilde{c}_s' + X - \tilde{c}_s'' \varphi_w - C\}} \qquad (4)$$

where E is electromotive force of streaming effect, R is gas constant, T is absolute temperature, F is Faraday constant, X is effective charge density, $J_v$ is volume flow, $f_{ij}$ is friction factor between species i and j, $\theta$ is tortuosity coefficient, $\phi_w$ is water fraction of water in membrane, $\Delta x$ is thickness of the membrane, $\tilde{c}_s$ is local salt concentration.

This Tanny-Hoffer theory clearly indicates the complexity of the concentration polarization phenomena. In order to use this theory for characterizing pores, it would be necessary to find experimental conditions where this concentration polarization would not develop. Practically speaking, the only available solution is to use an alternating driving force instead of a constant excitation, as is typical in traditional streaming current/potential measurements. To this end, there are several theoretical and experimental studies of the streaming current under oscillating pressure conditions. R. G. Packard in 1953, C. E. Cooke in 1955, J. N. Groves et al. in 1975, S. S. Dukhin et al. in 1983 and 1984, and L. Renaud et al. in 2004 and U.S.

Pat. No. 3,917,451, issued in 1975, to J. N. Groves and J. H. Kaplan all speak to measurements under oscillatory conditions. Their theoretical analysis indicates the appearance of the additional multiplier, which depends on Bessel functions of kR, but no additional dependence on porosity.

Essentially all these studies assume isochoric conditions and consequently are not directly applicable for describing the electrokinetic effect when isochoric conditions are not valid. This assumption was justified in the above documents because rather low frequencies excitation was applied. However, the use of low frequency excitation in the KHz range does not prevent formation of concentration polarization. Instead, the frequency must be in MHz range for complete elimination of this complex effect. However, isochoric condition does not hold at such high frequency and instead of streaming current, we should deal with seismo-electric phenomena.

J. Frenkel developed the first theory of the seismo-electric phenomena in 1944. He used Smoluchowski theory of the streaming current as a starting point, which is why his theory is valid only for the case of isolated thin DL. He derived the following expression for the electric field strength E induced by ultrasound in a porous body saturated with water:

$$E = \frac{8\varepsilon\varepsilon_0 \zeta k \omega^2 f \rho_m}{\eta K_m r^2} \left( \frac{K_2}{\rho_m} \frac{\beta}{\beta' c_s^2} - 1 \right) u \quad (5)$$

where u is amplitude of displacement, $c_s$ is sound speed, $K_2$ is compressibility modulus of the liquid, $\rho_n$, is density of liquid, f is porosity, k is Darcy constant that is proportional to the square of the pores radius r, $$\beta = \frac{1}{f(1+\alpha)}; \beta' = 1 + (\beta - 1)\frac{K_2}{K_0}$$

where $K_0$ is compressibility modulus of the solid phase, $\alpha$ is coefficient proportionality between variations of volume of solid and liquid phases.

Frenkel predicted that the electro-seismic electric field strength is proportional to porosity and independent of pore size, because of the Darcy constant dependence on the square of the pore size that cancels out size dependence in Eq. 5. There is no conclusive experimental confirmation of this prediction so far. This conclusion is valid only for isolated and thin double layers, which corresponds to the electric potential distribution in pores as illustrated by curve 1 on FIG. 1.

It is quite possible that the electro-seismic effect for the "homogeneous" completely overlapped double layer, case 2 on FIG. 1, would become dependent on pore size. This would open the possibility to characterize both pores size and porosity using two different liquids for saturating the porous body. Unfortunately, there is no theory valid for the "homogeneous" case yet.

Frenkel's equation does not present E as a function of the pressure gradient, in contrast with modern electro-acoustic theories. It also ignores phase shift in the electro-seismic signal that occur at ultrasonic frequencies. Existing theoretical developments in this field, instead of following the lines drawn by Frenkel 60 years ago, have shifted emphasis to the structure of the acoustic field in the soil. However, they ignore a basic principle underlying all electrokinetic theories at Smoluchowski limit regarding the similarity of the space distribution of hydrodynamic and electrodynamic fields in electrokinetics.

Despite the lack of adequate theories, the electro-seismic effect is very promising for characterizing porous bodies since it offers four important advantages:
 1. the ability to characterize very narrow pores in bodies with very low permeability, which complicates or even prevents pumping liquid in continuous flow mode;
 2. the elimination of concentration polarization;
 3. the possibility to characterize porosity and pore size using two different wetting liquids;
 4. the simultaneous characterization of electric properties of the pores surfaces.

U.S. Pat. No. 7,340,348, issued in March 2008, to Strack et al. discusses the acquisition and interpretation of seismoelectric and electro-seismic data, but is dedicated to empirical characterization of geological structures and makes no claims about the properties of pores.

Rather than use the seismo-electric effect on a geologic scale, we propose using it on a smaller laboratory scale, which we can achieve using a commercially available electro-acoustic device described in U.S. Pat. No. 6,449,563, issued September 2002 to A. S. Dukhin and P. J. Goetz. This instrument launches ultrasound pulses into a heterogeneous system and measures the electric response. According to said patent, the claimed use of the device was for characterizing particle size and zeta potential of dispersions and emulsions. In contrast, the current invention proposes using essentially the same device for characterizing the porosity, pore size and zeta potential of porous bodies, employing some modifications in sample handling and calibration. This porosity and pore size characterization is possible because the measured electro-acoustic signal generated by ultrasound in porous bodies is essentially seismo-electric current generated on scale of laboratory device.

BRIEF SUMMARY OF INVENTION

The applicant describes a new method of determining porosity, pore size and zeta potential of a porous body by transmitting ultrasound pulses at single or multiple frequencies through said body and measuring the magnitude and phase of the resulting electric current, or, alternatively applying an alternating electric field and measuring the generated ultrasound pulses. The applicant also presents a particular design of the instrument, which employs a previously described electro-acoustic spectrometer for generating and monitoring the seismo-electric effect in porous body, but with a new sample handling system. Calibration of the said instrument can be performed with initial measurement of stable colloid particles having a known zeta potential and, as the second step, measurement of electro-acoustic signal produced by the deposit formed by larger sedimenting particles. The porous body must be saturated with a low conducting liquid that causes overlap of the double layers inside of the pores for collecting information on pore size. Conversely, the porous body must be saturated with high conducting liquid that cause double layer to become thin comparing to the pore size and not-overlapped for collecting information on porosity. Calculation of these parameters would either include calibration with the same material and said properties measured independently, or application of appropriate theory. Measurement of the said electro-acoustic signal allows determination of iso-electric point where zeta potential of double layers in pores becomes zero. This can be achieved by varying the chemical composition of the liquid. The iso-electric point would be determined as particular chemical composition, usually pH, at which the phase of said electro-acoustic signal rotates 180 degrees. Measurement of the electro-acoustic signal phase yields also information on elastic properties of the matrix, which then can be used for calculating zeta potential with appropriate theory.

DETAILED DESCRIPTION OF INVENTION

The following detailed description of the invention includes: a description of the hardware required to practice the invention; a novel way to calibrate said electro-acoustic sensor; measurements of the seismo-electric current generated by deposits of solid sedimenting particles, porous chromatographic silica particles and geological cores; and interpretation of the collected experimental data in terms of porosity, pore size and zeta potential.

Hardware Description

Figure 2:
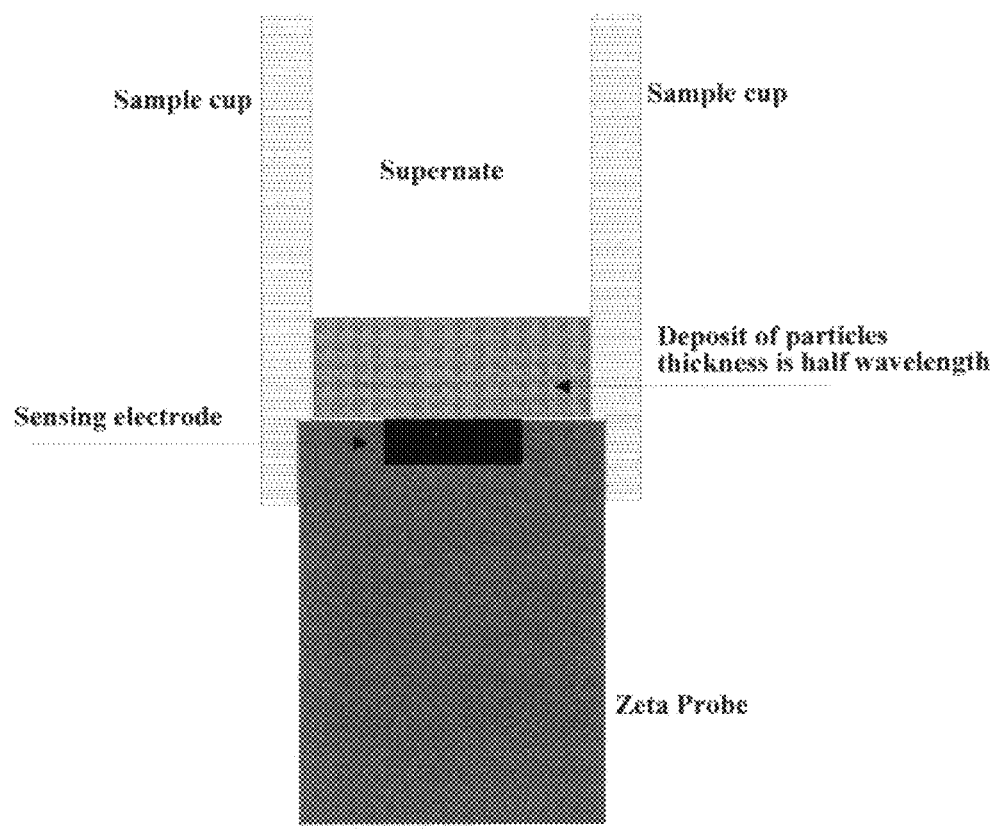
FIG. 2 illustrates electro-acoustic probe with novel sample handling system that allows measurement of particulates deposits and porous bodies.

The proposed instrument for measuring seismo-electric current employs an electro-acoustic spectrometer for generating and sensing this effect. There is one embodiment of such an electro-acoustic device presented in U.S. Pat. No. 6,449,563, issued September 2002 to A. S. Dukhin and P. J Goetz and commercialized by Dispersion Technology as a model DT-300. We use this device for experimental verification of the suggested method. We add a novel sample handling system and novel calibration procedure, which allow using this device for characterizing porous bodies rather than dispersions and emulsions, as was intended in said patent. The novel sample handling system is shown in FIG. 2. The electro-acoustic probe is placed vertically in a suitable stand that orients it such that the face of the probe with the gold electrode is on top. A cylindrical fixture around the top of the probe creates a cup with the probe face serving as a bottom of said cup. This cup can be filled with liquid and a porous body can be placed in this liquid in contact with the gold electrode. Ultrasound pulses generated by the electro-acoustic probe enter the liquid phase through the gold electrode, whereupon they enter the porous body that is placed on top of the gold electrode. The sound wave generates a seismo-electric current as it propagates through said porous body and is sensed as an alternating current between the gold electrode and its surrounding stainless steel shell. The electronics measures and processes these current pulses in a manner similar to the electro-acoustic pulses generated by dispersed particles as described in said patent.

Deposits of Solid Particles and Novel Calibration Procedure

We suggest a novel procedure for calibrating this probe using the seismo-electric current produced by a deposit of sedimenting solid particles. We want to provide proof that this electro-acoustic signal is indeed a seismo-electric current. To achieve this goal we orient the electro-acoustic probe vertically, as shown in FIG. 2, and allow the particles to build a deposit on the face of the gold sensing electrode. The sound pulses generated by the probe propagate directly into the deposit and should generate a seismo-electric current that would be measured as an electro-acoustic signal. We should expect some deviation in the electric field line pattern compared to that obtained during zeta potential calibration using a stable dispersion. It turns out that the measurement of a deposit offers a novel calibration procedure that automatically corrects for this deviation.

Figure 3:
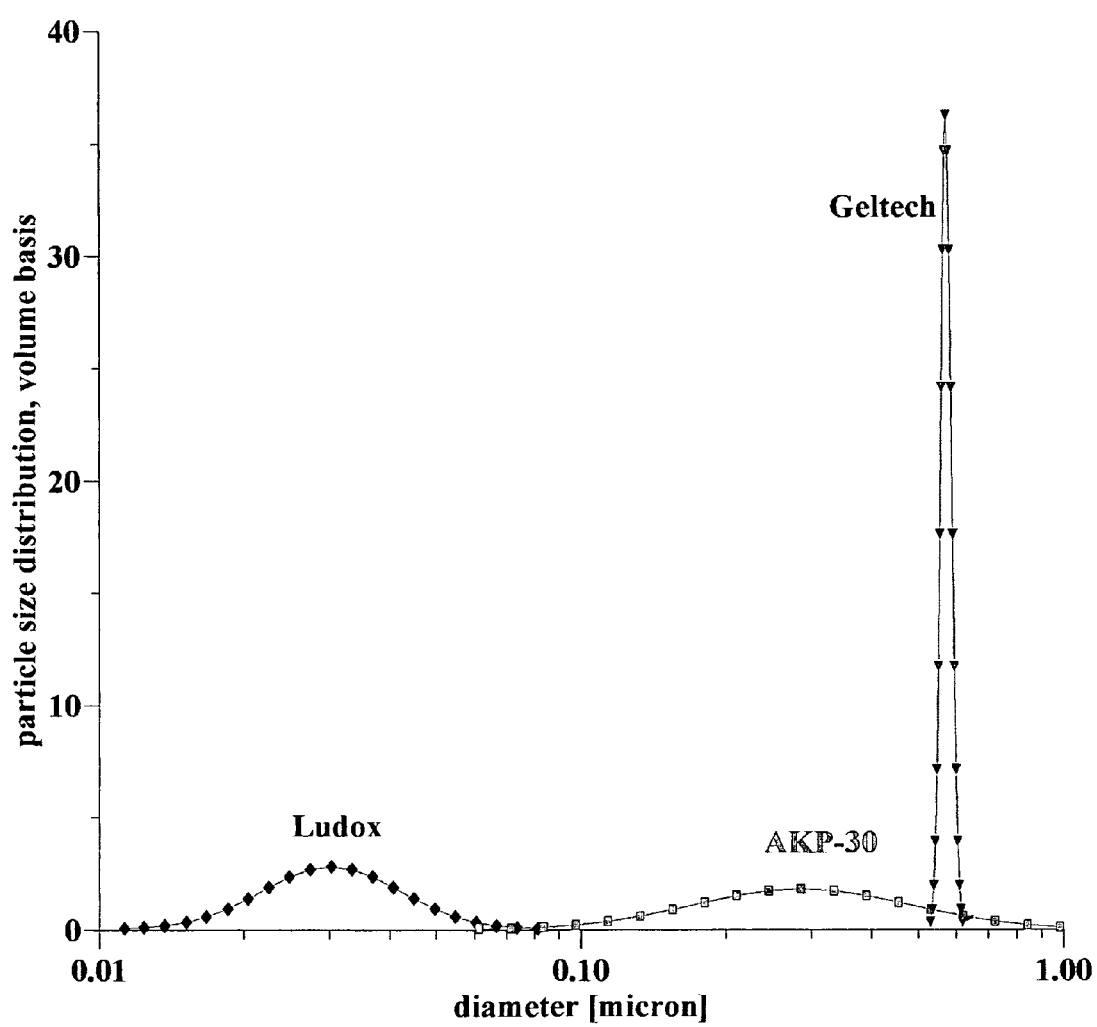
FIG. 3 illustrates particle size distributions of the silica and alumna dispersions measured with DT-1200 by Dispersion Technology Inc.

We used three different solid material particles: silica Ludox, silica Geltech 0.5 and alumina AKP-30. Each was prepared at a solid concentration of 10% by weight dispersed in distilled water. The pH, as given in Table 1, was adjusted in each case to provide good stability. The conductivity and ζ-potential of each sample was measured with the DT-300 before any sedimentation occurred. The particle size distribution of these same dispersions was measured with a DT-1200 acoustic sensor manufactured by Dispersion Technology with the results also given in Table 1 and PSD curves shown in FIG. 3.

TABLE 1

Properties of the dispersions that form deposits

| material | pH | Conductivity S/m | Debye length [nm] | Zeta potential [mV] | D50 [micron] | D10 [micron] | D90 [micron] | Density [g/cm$^3$] |
| --- | --- | --- | --- | --- | --- | --- | --- | --- |
| Ludox TM | 9.3 | 0.22 | 2.4 | −38 | 0.030 | 0.020 | 0.045 | 2.2 |
| Geltech 0.5 | 8.4 | 0.078 | 4.1 | −57 | 0.572 | 0.555 | 0.590 | 2.2 |
| Alumina AKP-30 | 4.6 | 0.032 | 6.5 | +54 | 0.286 | 0.155 | 0.530 | 3.9 |

Figure 4:
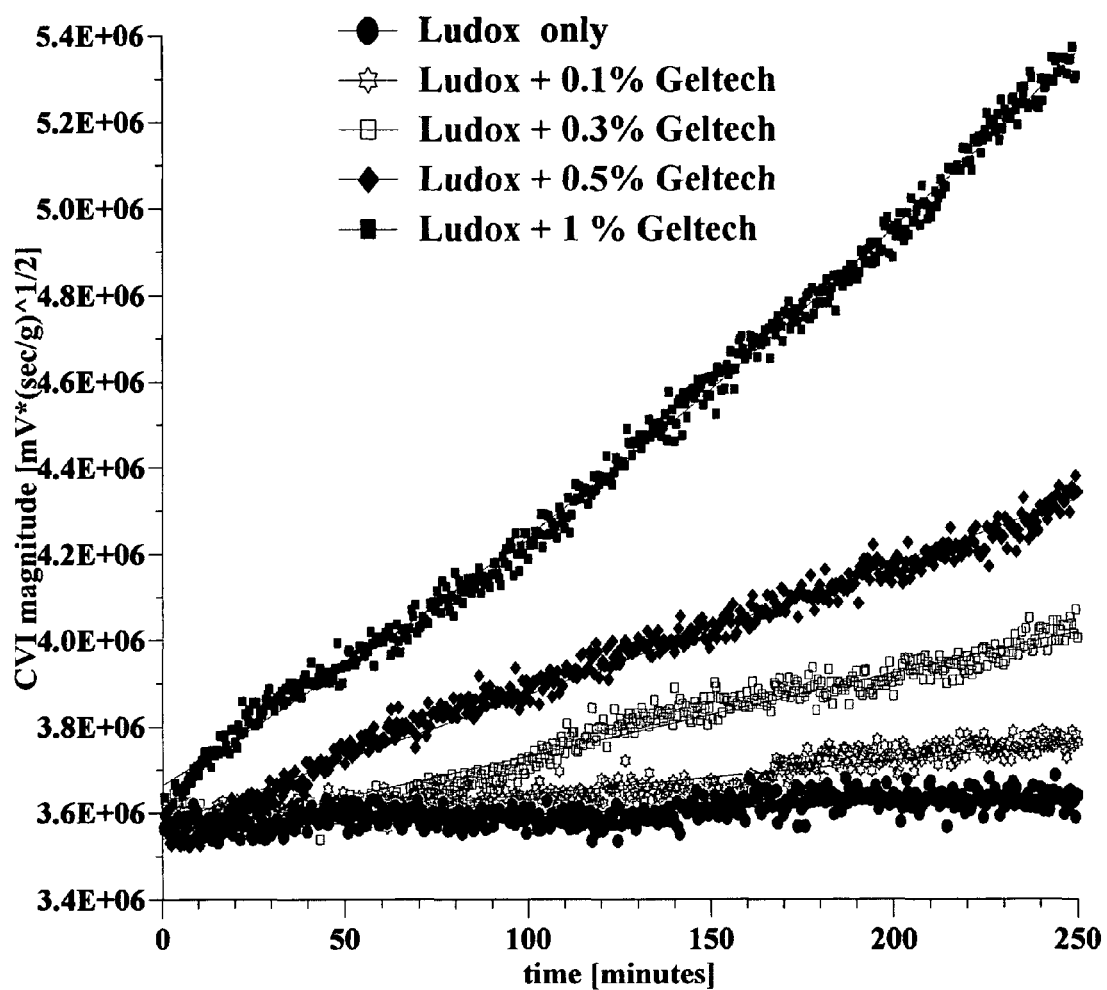
FIG. 4 illustrates kinetics of electro-acoustic magnitude evolution due to deposit of silica Geltech particles added in small amounts to silica Ludox.

FIG. 4 shows the time trend of the CVI signal for five 10 wt % Ludox samples, each successive sample containing increased amounts of Geltec from 0 to 1%. The electro-acoustic signal of the unadulterated Ludox sample does not change with time, which is expected since these very small 30 nm particles do not sediment appreciably during the period of measurement. However, the added small amount of the larger silica Geltech particles causes a time rate of change proportional to the amount of the added large particles due to an accumulation of these particles near the probe surface. We see that the measurement is very sensitive to even small amounts of the larger particles, as little as 0.1%. This behavior confirms that the measured signal comes from the area near the probe surface.

Figure 5:
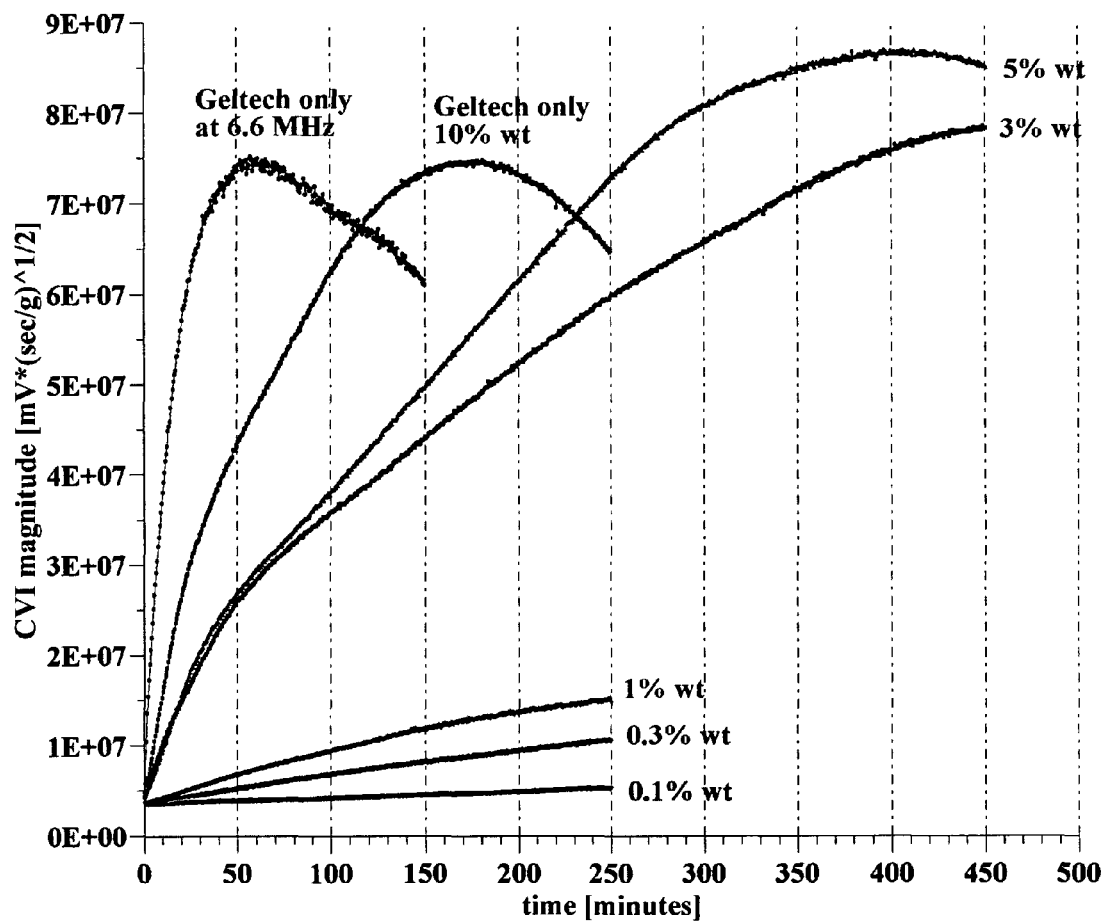
FIG. 5 illustrates kinetics of electro-acoustic magnitude evolution due to deposit of silica Geltech particles added in substantial amounts to silica Ludox.

FIG. 5 includes the data from FIG. 4, but on a larger scale also shows data for even higher concentrations of Geltec at 3% and 5%. Also shown is a 10 wt % Geltec dispersed simply in water.

These experiments demonstrate that the electro-acoustic signal in each case reaches some saturation level at a certain moment in time. The question arises as to the reason for such time dependence. Why does the measured signal first reach a maximum and then decrease somewhat?

The gradient of pressure determines the direction of the particles motion within the sediment and in turn determines the magnitude and phase of the electro-acoustic signal. At the start of the sedimentation experiment, the particles have settled only slightly and all particles experience the same gradient of pressure and move in the same direction thereby contributing signal in the same phase. When the sediment reaches a depth equal to one-half wavelength the magnitude of the signal reaches a maximum value since the peak signal occurs at an instant for which all the particles within this depth move in the same direction. However, when the depth of the sediment becomes slightly larger than a half wavelength, the peak signal occurs at an instant of time when the particles in the top layer are moving in the opposite direction to that of particles below this depth and thereby subtract from the measured signal. Therefore, the signal reaches maximum when particles have finished filling this half-wavelength layer and then begin decay when the second half wavelength layer starts filling up. However, particles in the second layer are further away from the surface than in the first layer and therefore the sound is weaker there due to attenuation and particles of the second half wavelength layer can never completely compensate the contribution of the first layer. Eventually, after filling several half wavelengths, the signal comes to some steady state level.

Let us denote this critical sediment thickness at which the sediment fills to a depth of half wavelength by:

$$H = \frac{1}{2}\lambda \quad (6)$$

There several ways to verify this hypothesis of observed correlation between the measured time trend in the electro-acoustic signal and sedimentation.

Figure 6:
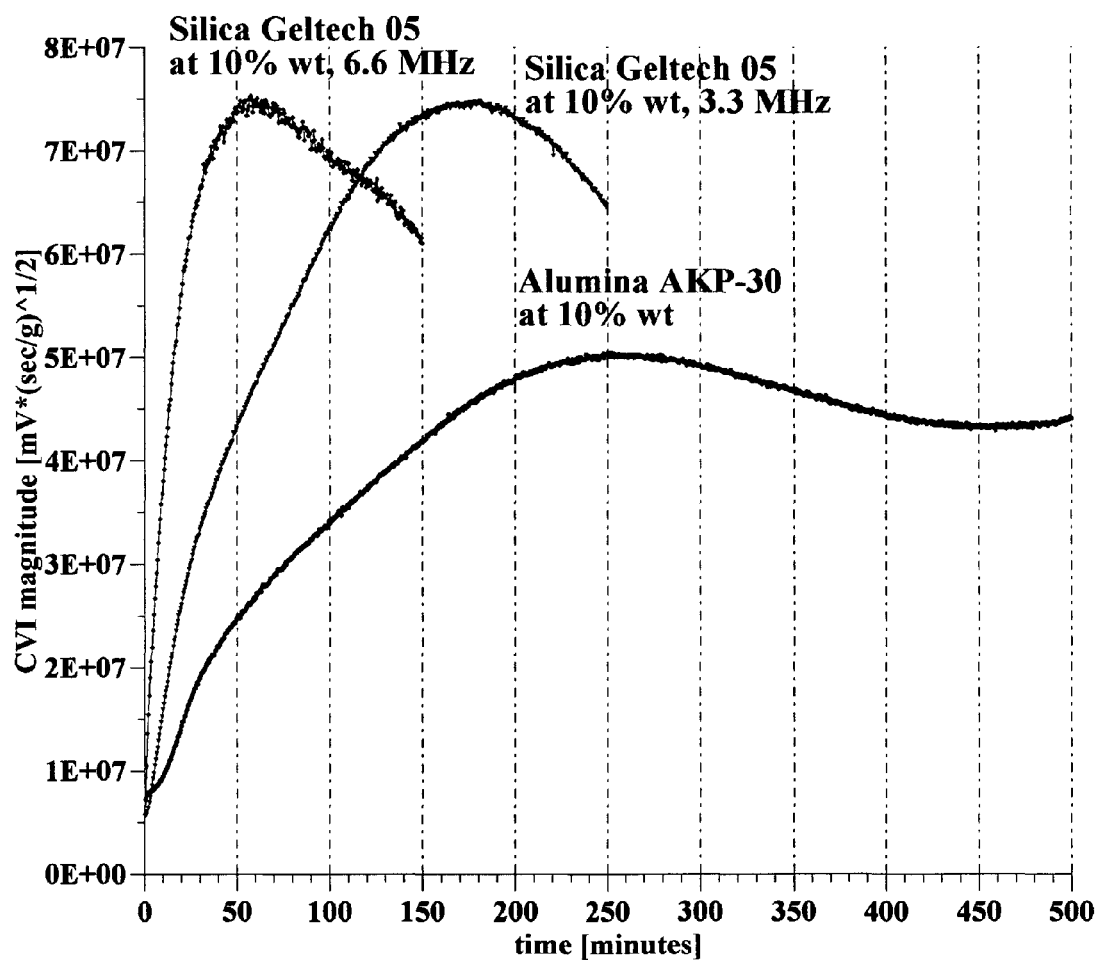
FIG. 6 illustrates kinetics of electro-acoustic magnitude evolution due to deposit of silica Geltech particles and alumina AKP 30 at 10% wt.

The DT-300 typically performs electro-acoustic measurements at a frequency of 3.3 MHz, corresponding to a wavelength in water of about 500 microns. Accordingly, the thickness of the sediment layer in which all particles move in the same direction due to same sign of the pressure gradient is about 250 microns. Increasing the frequency twofold would reduce thickness of the first half-wavelength layer from 250 microns to 125 microns. This thinner layer should be filled twice as fast at 6.6 MHz as at 3.3 MHz. FIG. 6 compares the time evolution for an identical 10 wt % Geltech sample measured at 3.3 and 6.6 MHz. The time to reach the maximum decreases from 178 to 58 minutes, somewhat more than the expected two times decrease, but more or less confirming our hypothesis. (We think that the somewhat faster than expected time to reach the maxima at the higher frequency occurs because the fewer particles in the this thinner sediment layer produce a reduced pressure in the deposit leading to a correspondingly smaller packing density, and hence require less time to fill the layer.)

By the same logic, if we reduce the concentration of Geltec particles by two times, from 10% to 5%, we would expect the critical time required to reach a maximum CVI signal to increase by two times. FIG. 5 shows that this is indeed the case, as the time to reach a maximum increases from 178 minutes to 395 minutes.

FIG. 6 shows that a 10 wt % alumina dispersion reaches a maximum even more slowly than the silica Geltech sample due to smaller particle size. The critical time for the Geltec sample is about six hours.

Figure 7:
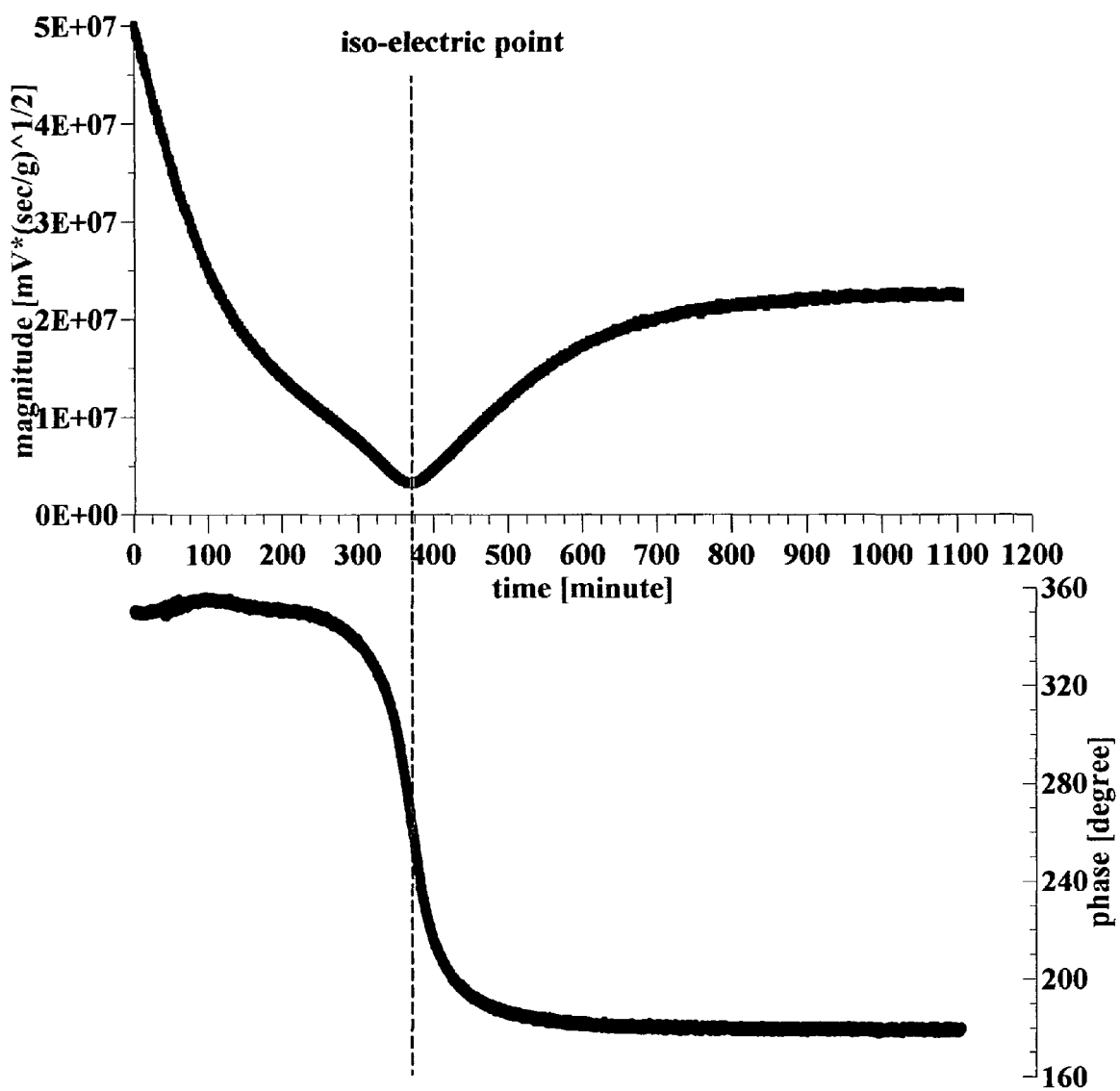
FIG. 7 illustrates kinetics of electro-acoustic magnitude and phase evolution due to re-charging of alumina particles in the deposit due to reduction of pH.

We can test our hypothesis that the signal arises primarily from particles in the deposit on the probe surface by changing the ζ-potential of the particles. We can achieve this by varying the pH in the solution above this alumina deposit. Alumina is a good choice for this test because it has well-known isoelectric point at pH=9. The supernate solution above the deposit initially had a pH of 4.6. At this point, we injected a small amount of 1M KOH into the supernate which increased the pH to 11. The sample was not mixed in order to keep deposit intact: We relied only on ion diffusion to change the pH in the deposit. FIG. 7 shows continuing values of electro-acoustic signal magnitude and phase. It is seen that magnitude exhibits an immediate and rapid decay, which reflects a decrease of the ζ-potential in the deposit due to increasing pH. However, the phase begins to change only after about four hours. This is an indication that some particles, apparently on the top of the deposit, begin to re-charge. It is known from general electro-acoustic theory that the most pronounced characteristics of the iso-electric point is a 180 degree change in the phase of the measured electro-acoustic signal. We observe this phase shift here, but spread out over three hours. This gradual shift in phase agrees with our assumption of slow ion diffusion through the deposit and a slow recharge from the top to bottom of the sediment.

Having confirmed our hypothesis concerning the interpretation of these sedimentation trends, we can now apply these data for calculating the properties of the deposit. Knowing the critical thickness H, the time $t_{cr}$ to reach the maximum signal, and the original volume fraction of the dispersion $\phi$, allows us to estimate the volume fraction $\phi_{sed}$. In other words, we can calculate porosity of the deposit using the measured kinetic curve.

Let us assume that we have dispersion of spherical particles with an initial homogeneous volume fraction $\phi$, density $\rho_p$ in a Newtonian liquid with density $\rho_m$ and dynamic viscosity $\eta$. The particle size distribution is assumed lognormal and denoted as $P(a_i)$, where $a_i$ is radius of particles in the fraction i with a fractional volume fraction $\phi_i = \phi P(a_i)$ These particles are settling, under the influence of a specific acceleration g, at a fractional sedimentation velocity $V_i$ given by:

$$V_i = \frac{2(\rho_p - \rho_m)g a_i^2}{9\eta} \tag{7}$$

These settling particles build up a deposit on the face of the probe. It takes time t, to fill the first half wavelength layer H. Having this time from experiment, we can calculate how many particles have reached surface of the probe due to sedimentation. We should take into account that each fraction of particles contributes individually and presumable independently to this deposit-building process based on the sedimentation velocity of its respective volume fraction. This gives us the following equation for the volume fraction of particles in the deposit:

$$\varphi_{sed} = t_{cr} \frac{\sum_i V_i \varphi_i}{H} \tag{8}$$

$$= t_{cr} \frac{\varphi}{H} \sum_i V_i P(a_i)$$

$$= t_{cr} \frac{2g(\rho_p - \rho_m)\varphi}{9\eta H} \sum_i a_i^2 P(a_i)$$

We can apply this equation to calculate the volume fraction of the silica and alumina deposits. In the case of silica Geltech, the critical time $t_{cr}$ equals 178 minutes and the average square of the particle diameter in microns is 0.325. This leads to the following value for the volume fraction of the silica in the deposit:

$$\varphi_{sed} = t_{cr}[\text{sec}] \frac{2*9.8*1.2*0.048}{9*250*4} \sum_i a_i^2 P(a_i)[\text{micron}^2] = 0.37$$

In the case of alumina AKP-30, the critical time $t_{cr}$ equals 240 minutes and the average square of particle diameter in microns equals 0.152, which yields following value for the volume fraction:

$$\varphi_{sed} = t_{cr}[\text{sec}] \frac{2*9.8*3*0.048}{9*250*4} \sum_i a_i^2 P(a_i)[\text{mircon}^2] = 0.66$$

These results correlate well with the measured particle size distributions of the silica and alumina materials. Alumina is much more polydisperse, which in principle allows more dense packing of particles in the deposit.

It is important to stress here that we have not yet used any electro-acoustic theory, just the obvious mass balance and the assumption of Stokes sedimentation of individual particles.

We can test the applicability of the existing electro-acoustic theory that was developed for dispersions using the maximum value of the electro-acoustic signal. This theory assumes that particles move relative to the liquid due to the density contrast. This electro-acoustic effect is called colloid vibration current (CVI) and described in details by A. S. Dukhin and P. J. Goetz. There is a well-verified theory of CVI for concentrated dispersion, which yields a simple equation for CVI at the Smoluchowski limit for sufficiently small particles:

$$\frac{CVI_{\omega \to 0}}{\nabla P} = A(\omega) \frac{\varepsilon_m \varepsilon_0 \zeta \varphi K_s}{\eta K_m} \frac{(\rho_p - \rho_s)}{\rho_s} \tag{9}$$

where $\phi$ is volume fraction of the dispersed phase, $\phi=1-f$, f is porosity, $\rho_p$ and $\rho_s$ are density of the particles and of the dispersion:

$$\rho_s = \rho_p \phi + \rho_m (1-\phi)$$

The parameters $K_s$ and $K_m$ are the conductivity of the dispersion and media respectively. According to Maxwell-Wagner theory [5], their ratio at high frequency and with negligible surface conductivity equals:

$$\frac{K_s}{K_m} = \frac{1-\varphi}{1+0.5\varphi} \tag{10}$$

The parameter A is a calibration constant determined with calibration procedure using silica Ludox.

If we assume that the measured signal generated by the deposit is CVI, then we can use the volume fraction of particles in the deposit as calculated above to estimate the $\zeta$-potential. If our assumptions were valid, then this estimate of the zeta potential would be similar to that measured for the dispersion of the same material as was presented in the Table 1.

However, it turns out that the zeta potential value of calculated using these data with traditional theory is an unbelievable $-244$ mV for silica Geltech and an almost equally unbelievable value of 151 mV for alumina AKP-30. (We should perhaps note that these calculations have neglected the effect of the particle size, but including this would only make the computed zeta potential values even larger.) These unreasonable zeta potential values prove that traditional theory does not describe generation of the electro-acoustic signal in the deposit and that the applicable phenomenon is not colloid vibration current.

This is hardly surprising at this point. We have already stated that the mechanism of electro-acoustic coupling in deposits and porous bodies is completely different from that of dispersions. The propagating ultrasound wave expands and contracts the deposit. Particles in the deposit are pushed together by gravity, but because of the high $\zeta$-potential they do not aggregate. Rather, they build a flexible network that moves relative to the liquid, in the process displacing ions in the double layer and generating a streaming current. This occurs in a non-isochoric mode, and as discussed above, the alternative term for this phenomenon is a seismo-electric effect.

There is one more important fact. The phase of CVI signal is shifted relative to the ultrasound phase due to inertial effects. This phase shift must exist even for submicron particles used in this work if generated measured signal is CVI indeed.

However, we do not observe such phase shift. For positive alumina, phase is 360 degrees within 1 degree. For negative silica and re-charged alumina, it is exactly 180 degrees within 1 degree. This indicates that particles size does not play any role. Relative motion of solid and liquid phases occurs in phase with ultrasound. This correlates with suggested notion of the weak very flexible network in the deposit.

For calculating ζ-potential of the particles in these deposits, instead of the Eq. 9, we should use another equation, which would be derived from the Frenkel's theory. This theory yields expression for seismoelectric potential E and as a function of system displacement u, Eq.5. Electro-acoustic probe measures current, not potential and as function of the pressure gradient, not displacement. We can replace displacement with pressure using general equation from the acoustic theory:

$$u = \frac{P_t^{ik(x-ct)}}{i\omega c_s \rho_s} \quad (11)$$

Also, transition from the potential to current usually brings conductivities ratio, conductivity of the system divided by conductivity of media. This means that we can guess an approximate equation for the seismoelectric current $I_{see}$ as following:

$$\frac{I_{see}}{\nabla P} = \frac{\varepsilon_0 \varepsilon_m \zeta}{\eta} \frac{\rho_m}{\rho_s} \frac{K_s}{K_m} \quad (12)$$

If we would use this equation, ζ-potentials for alumina and silica particles in deposits would become −68 mV and 98 mV correspondingly. These values are mush closer to the real ζ-potential values for these materials. Difference might be related to the neglected surface conductivity or to the unknown yet function of the compressibilities.

Controlled Pore Glass (CPG) Samples

As a next step, we can use large porous particles instead of solid particles for building the deposit. We selected some well-characterized silica-based porous particles manufactured for chromatography use. We used a set of five CPG powders provided by Quantachrome Corporation, each having the same porosity but a different pore size. The particle size of such material usually exceeds 50 microns so they build a very rapid deposit. These materials allow us to verify the prediction of Frenkel's theory that the magnitude of the seismo-electric signal is independent of the pore size for thin and isolated double layers. In order to perform such a test, we should saturate the pores with a liquid having an appropriate ionic strength. The Double Layer would be completely overlapped at low ionic strength and for this case we should expect a dependence on pore size. In contrast, for high ionic strength liquid, the Double Layer would be thin compared with pore size and dependence of the signal with pore size should diminish.

We use three different liquids: ethanol, distilled water and a 0.11 molar KCl solution. Each sample was prepared by adding 0.5 g of particles to 10 ml of the liquid. The sample was placed into the sample cup after 10 minutes of equilibration. The particles build a complete deposit on the surface of the electro-acoustic probe within one minute. The thickness of this deposit exceeded 1 mm, which eliminates any electro-acoustic signal dependence on the deposit height. The experiment protocol consisted of five consecutive measurements of the electro-acoustic signal. Each measurement takes about 30 seconds for a water-based samples and about 1 minute for the others. In order to test that the deposit structure is uniform, we use a pipette to re-suspend the particles and then allow them to build yet another deposit. Such re-deposition of the sample causes some variation in the measured signal. Usually, this variation is very little, much smaller than difference between samples. However, it was still larger than precision of the each five measurements set, which is in average 0.015 of 1 million units of the electro-acoustic signal.

Table 2 presents data on the pore size, pore volume and porosity of these CPG samples as measured by mercury intrusion and extrusion experiments. The experiments were performed over a wide range for pressures starting in vacuum and continuing up to 60000 psi (1 psi=6.895×10$^{-3}$ MPA) using a Quantachrome Poremaster 60 instrument. The same Table also presents the electro-acoustic signal magnitude measured for these particles when saturated with 0.11 KCl solution. According to Frenkel's theory, this signal should correlate mostly with porosity and become independent of the pore size, because high ionic strength makes for a thin isolated DL. We can see that this prediction of the Frenkel's theory is valid.

TABLE 2

Magnitude of electro-acoustic signal measured for five different CPG samples saturated with 0.11 KCl solution.

| | Pore size [nm] | | | | |
|---|---|---|---|---|---|
| | 12 | 40.6 | 63.7 | 92.4 | 136 |
| Pore volume [cc/g] | 0.478 | 1.07 | 1.18 | 0.79 | 1.109 |
| Porosity, % | 51.3 | 70.2 | 72.2 | 63.5 | 70.9 |
| Electro-acoustic signal magnitude [$10^6$ mV * (sec/g)$^{1/2}$] | 0.83 | 1.5 | 1.3 | 1.29 | 1.23 |

Table 3 presents data for the electro-acoustic signal for the same particles, but instead saturated with different liquids having widely different conductivity and corresponding Debye length. We omit data for the sample with the smallest 12 nm pores, because the size of these pores becomes comparable with size of ions in low conducting ethanol and this might create artifacts.

Figure 8:
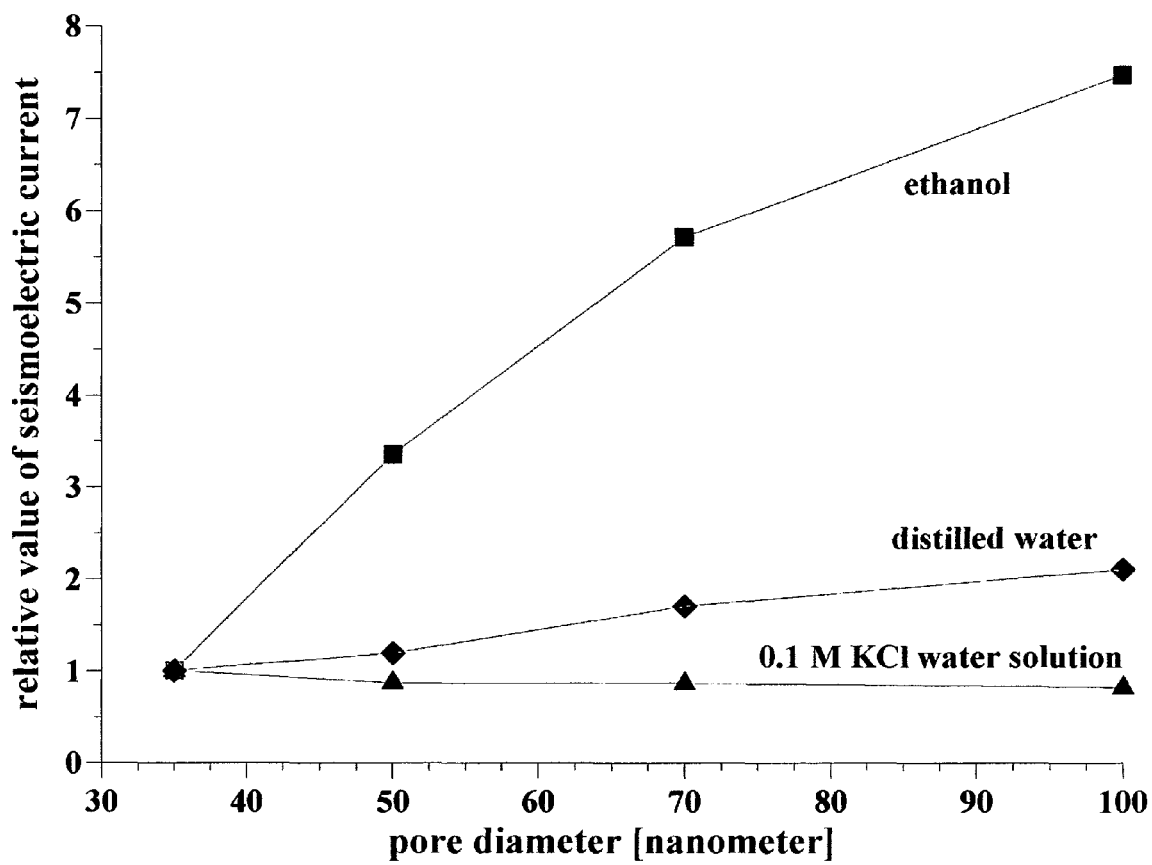
FIG. 8 illustrates values of seismo-electric current magnitude generated by four porous silicas with the same porosity and different pore sizes in liquid with different ionic strength.

It is seen that decreasing the ionic strength "turns on" the electro-acoustic signal dependence on pore size. FIG. 8 presents this same Electro-acoustic data, but the signal is normalized such that the value for the smallest pore size of 35 nm is taken as unity. This observation does not contradict Frenkel's theory because the DL becomes completely overlapped in ethanol. There is no existing theory that would describe seismo-electric current under these conditions.

TABLE 3

Magnitude of electro-acoustic signal measured for four different CPG samples saturated with different liquids.

| | | | Pore size [nm] | | | |
|---|---|---|---|---|---|---|
| | | | 40.6 | 63.7 | 92.4 | 136 |
| | Conductivity [S/m] | Debye length [nm] | Electro-acoustic signal magnitude [$10^6$ mV * (sec/g)$^{1/2}$] | | | |
| ethanol | 2.710E−5 | 226 | 0.064 | 0.22 | 0.37 | 0.48 |
| Distilled water | 2.410E−4 | 75 | 2.7 | 3.3 | 4.7 | 5.8 |
| 0.11M KCl | 1.3 | 1 | 1.5 | 1.3 | 1.29 | 1.23 |

This experiment confirms that we can use liquid with a high ionic strength for saturating porous bodies in order to eliminate pore size influence and determine only porosity. Then, we can saturate the same porous body with low conducting liquid and get information on pore size.

Geological Cores

We have measured several cylindrical geological cores of sandstone from different mines. They are marked according to the place of origin as Ohio SS, Berea SS and Orchard SS. These objects are examples of a truly porous body versus sediment plugs considered above.

Initially these cores are wetted in distilled water. The composition of the covering solution changes over time due to ion exchange and the conductivity eventually increase to 0.0179 S/m, which roughly corresponds to 0.001M and a Debye length of roughly 8.7 nm, as noted in Table 3. This would correspond to an isolated thin DL condition for these relatively large pores. As the next step, we dried these cores and then wetted them in hexane. The conductivity of hexane, measured with a Dispersion Technology DT-700, is less than $10^{-11}$ S/m, which corresponds to a Debye length greater than 6.5 microns. This estimate of Debye length includes correction for the increased ion size in non-polar liquids. This would correspond to an overlap DL condition for these now relatively small particles.

Figure 1:
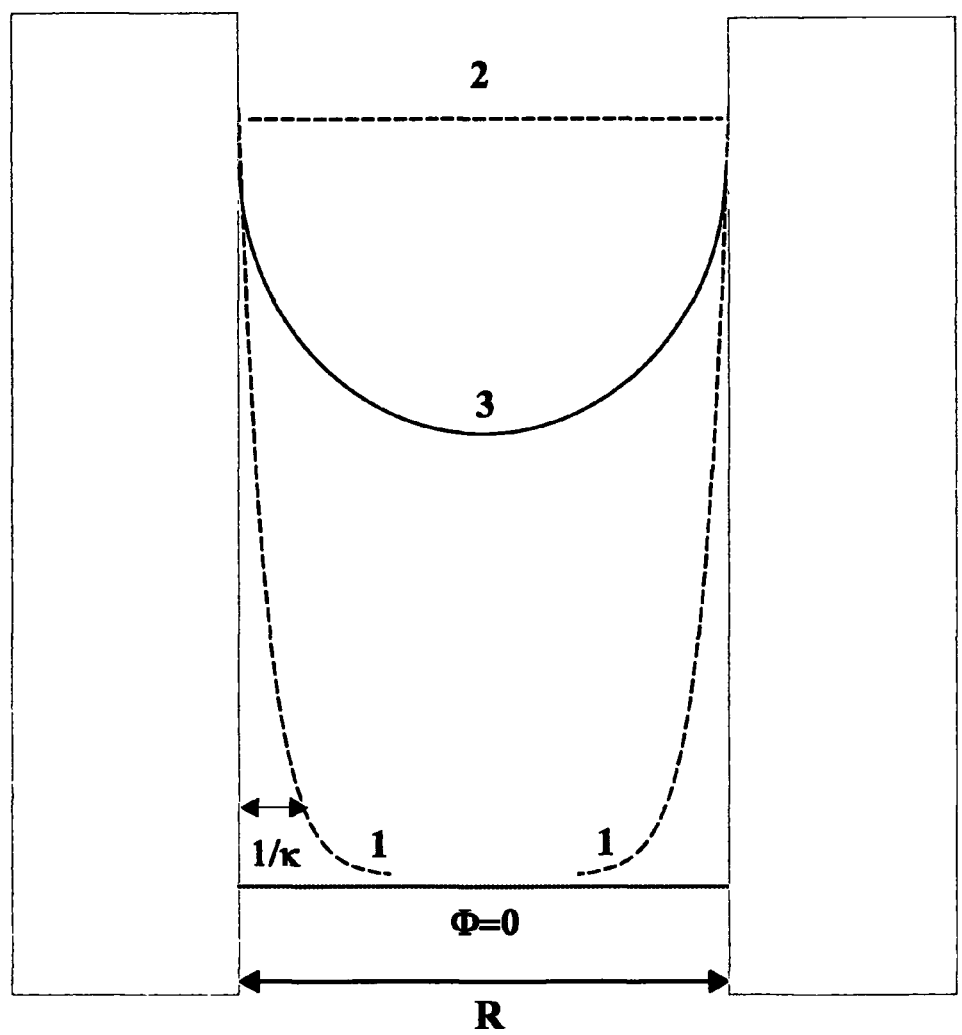
FIG. 1 illustrates possible distributions of electric potential inside of the pores, where case (1) corresponds to thin isolated double layers, case (2) to homogeneous model of completely overlapped double layers, case (3) is partially overlapped double layers.

The cores are placed on their sides in order to expose both circular faces of these cylinders to the solution and allow their simultaneous equilibration. After the equilibration process has finished, the same equilibrium solution is used to fill the cup on the top face of the electro-acoustic probe, as shown in FIG. 1.

In order to verify that the measured signal is generated in the core, we measured the pure liquid used for equilibration. The signal was at least 100 times lower than that subsequently measured for core itself. We also placed solid Teflon rod on the probe for confirmation that porosity is essential for the measurement. The signal was again more than 100 times smaller than for the core. This was confirmation that measured electro-acoustic signal comes from the core pores and is essentially seismo-electric current.

After measuring just the equilibrium liquid, the core is submerged in this liquid on the face of the probe centered on the gold sensing electrode.

Each signal from each core was measured continuously many times in order to confirm that equilibration process has indeed finished. After one side was measured, the core was turned upside down and the opposite side was done to verify the homogeneity of each core.

The value for the measured electro-acoustic (seismo-electric) signal magnitude are shown in Table 4 together with the porosity and pore sizes for these cores as measured independently by mercury intrusion and extrusion instruments as described previously.

TABLE 4

Magnitude of electro-acoustic (seismo-electric) current measured for several sandstone cores with certain pore size and porosity.

| | Electro-acoustic signal magnitude $[10^6 mV * (sec/g)^{1/2}]$ | | | |
| --- | --- | --- | --- | --- |
| | Water $K_m = 0.018$ S/m; $\kappa^{-1} = 8.7$ nm | Hexane $K_m < 10^{-11}$ S/m; $\kappa^{-1} > 6.5$ μm | Porosity | Pore size [micron] |
| Ohio | 2.23 | 0.014 | 0.086 | 0.6 |
| Berea | 0.83 | 0.049 | 0.095 | 12.8 |
| Orchard | 0.57 | 0.15 | 0.025 | 0.34 |

There is a good correlation between the porosity and electro-acoustic magnitude for the water saturated Ohio and Orchard cores. The ratio of the cores porosity for these two materials is 3.44, which is close to the ratio of the electro-acoustic signals of 3.91. This agrees with the theoretical prediction because it is the thin and isolated DL case and pore size difference should play little or no role. However, data for the Berea core does not agree with this trend as the magnitude of the electro-acoustic signal is much less than for Ohio SS core, despite very similar porosity. We think that the anomaly it is explained by the nature of the hydrodynamic flow inside the pores. At high frequency in MHz range the hydrodynamic flow could not completely develop if pore size is larger than "hydrodynamic viscous depth" which corresponds to the distance from an oscillating surface over which a shear wave decays by a factor of 1/e as it passes into the bulk of the liquid. This depth is approximately equal to 1 micron for our 3 MHz ultrasound frequency. This means that the hydrodynamic field is completely developed inside of Ohio and Orchard cores, but the interior of the Berea core pores remain undisturbed. This shows up in the experiment as a lower porosity. This is why the electro-acoustic signal of the Berea SS is lower than for Ohio SS.

Measurement in hexane confirms the theoretical prediction that pore size becomes important with increasing Double Layer thickness. The magnitude of the electro-acoustic signal generated by Berea core is several times higher than for Ohio core, which can be explained with much larger pore size for Berea core.

Figure 9:
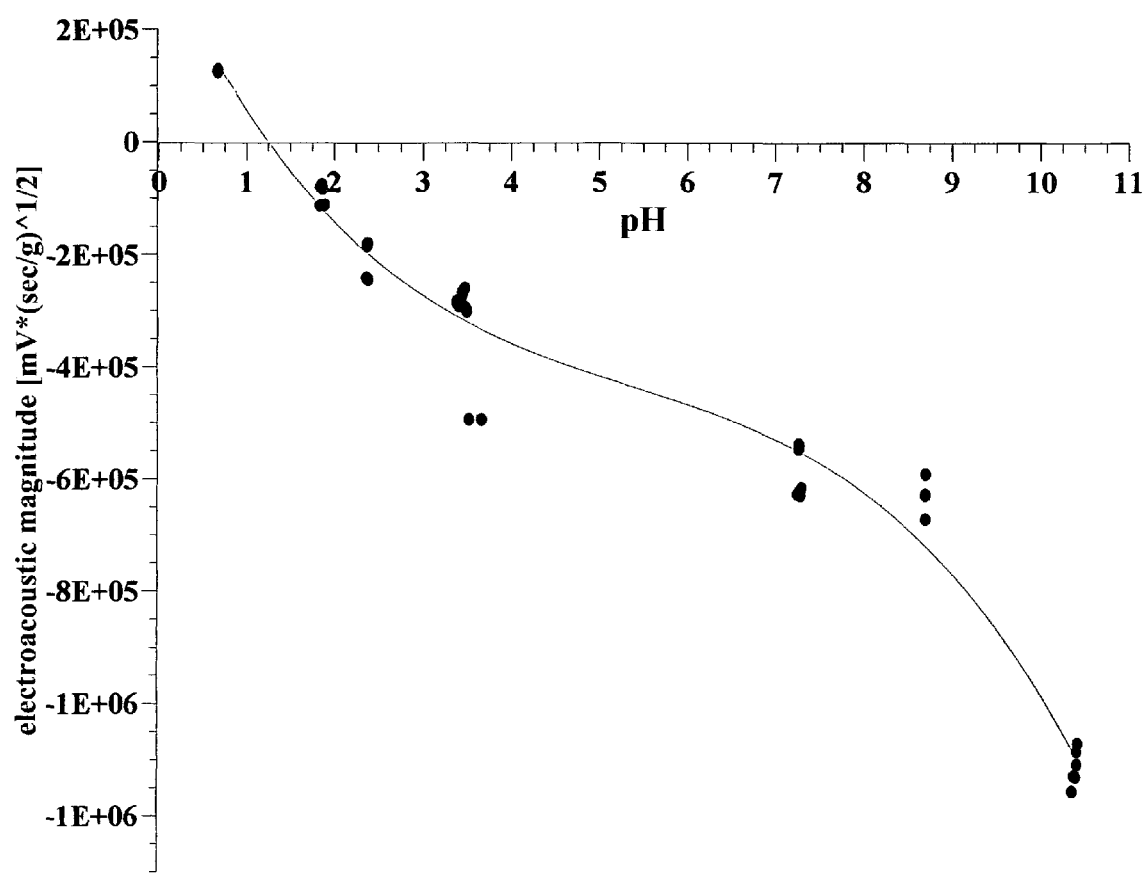
FIG. 9 illustrates dependence of the seismo-electric current magnitude on pH for sandstone Berea core.

Measurement of the Orchard core is the most surprising. It is several times higher than for the two other cores. There is only one explanation: The Orchard core chemistry leads to a much higher surface charge in hexane. In order to confirm this hypothesis that surface chemistry indeed affects the measured electro-acoustic (seismo-electric) signal, we ran a pH titration of an Ohio core. The core was equilibrated in a beaker containing 0.01M KCl adjusted to different pH values. The signal was then measured by placing the core and its pH adjusted media in the sample cup as already described. The pore surface of the sandstone cores is largely silica, which normally exhibits a zeta potential which gradually diminishes towards zero from an initial negative value with decreasing pH. Electro-acoustic signal produced by the core should similarly decay with lower pH if it is generated by interior double layers, which in fact agrees quite well with the experimental results shown on FIG. 9. The final reversal of polarity at the lowest pH might be promoted by Fe ions coming into the solution from the slightly dissolving steel at this very acidic pH.

U.S. PATENT DOCUMENTS

| | | | |
| --- | --- | --- | --- |
| 3,917,451 | November 1975 | Groves et.al. | 436/518 |
| 5,804,727 | September 1998 | Lu Wei-yang et all | 73/597 |
| 6,449,563 | October 2002 | Dukhin et al. | 702/22 |
| 6,684,701 | July 2004 | Dubois et al. | 73/579 |
| 6,745,628 | June 2004 | Wunderer | 73/579 |
| 6,899,680 | May 2005 | Hoff et al. | 600/449 |
| 6,959,602 | November 2005 | Peterson et al. | 73/602 |
| 7,340,348 | March 2008 | Strack, et al. | 702/14 |
| 7,353,709 | April 2008 | Kruger et al. | 73/599 |
| 7,340,348 | March 2008 | Strack et al. | 702/14 |

OTHER PUBLICATIONS

1. Lowell, S., Shields, J. E., Thomas, M. A. and Thommes, M. "Characterization of porous solids and powders: surface area, pore size and density", Kluwer Academic Publishers, The Netherlands, 2004.
2. Frenkel J. "On the Theory of Seismic and Seismoelectric Phenomena in a Moist Soil", J. of Physics, USSR, vol. 3, 5, pp. 230-241 [1944], re-published J. Engineering Mechanics, [2005].

3. Biot, M. A. "Theory of propagation of elastic waves in a fluid-saturated porous solid. 1. Low frequency range. J. Acoustic Society of America, vol. 28, 2, pp. 168-178 [1956]
4. Biot, M. A. "Theory of propagation of elastic waves in a fluid-saturated porous solid. 1. High frequency range. J. Acoustic Society of America, vol. 28, 2, pp. 179-191 [1956]
5. Lyklema, J., "Fundamentals of Interface and Colloid Science", vol. 1-3, Academic Press, London-NY, (1995-2000).
6. "Measurement and Interpretation of Electrokinetic Phenomena", International Union of Pure and Applied Chemistry, Technical Report, published in Pure Appl. Chem., vol 77, 10, pp. 1753-1805, 2005.
7. Ogushwitz, P. R. "Applicability of the Biot theory. 1. Low-porosity materials", J. Acoustic Society of America, vol. 77, 2, pp. 429-440, 1984
8. Barrett-Gultepe, M. A., Gultepe, M. E. and Yeager, E. B. "Compressibility of colloids. 1. Compressibility studies of aqueous solutions of amphiphilic polymers and their adsorbed state on polystyrene latex dispersions by ultrasonic velocity measurements", J. Phys. Chem., 87, 1039-1045, 1983.
9. Ivanov, A. G. Bull. Academy of Sciences, USSR, Serie geographique et geophysique, no. 5, 699, 1940
10. Williams M., "An Electrokinetic Transducer", The review of scientific instruments, 19, 10, 64-645 [1948]
11. Dukhin, A. S. Observation of sol-gel transition for carbon nanotubes using electroacoustics: Colloid vibration current versus streaming vibration current. JCIS, 310, 1, 270-280 (2007)
12. Muller, E. and Mann, C. "Resin characterization by electro-acoustic measurements", J. of Chromatography A, 1144, 30-39, 2007.
13. Dukhin, A. S. and Goetz P. J. "Ultrasound for characterizing colloids", Elsevier, [2002]
14. Markov, M. G. "Simulation of the electroseismic effect produced by an acoustic multipole source in a fluid-filled borehole", SPWLA 45$^{th}$ Annual Logging Symposium, [2004]
15. Zhu, Z., Burns, D. R. and Toksoz, M. N. "Electroseismic and seismoelectric measurements of rock samples in a water tank", MIT [2007]
16. Zhu, Z., Haarsten, M. W. and Toksoz, M. N. "Experimental studies of electrokinetic conversion in fluid-saturated borehole", Geophysics, 64, 1349-1356 [1999]
17. Pride, S. R. and Haartsen, M. W. "Electroseismic waves properties", J. Acoust. Soc. Amer., 100, 1301-1315 [1996]
18. Pride, S. R. "Govering equations for the coupled electromagnetic and acoustics of porous media", Physical Review, B, 50, 15678-15696 [1994]
19. Haarsten, M. W. and Pride, S. R. "Electroseismic waves from point sources in layered media", J. of Geophysical Research, 102, 24745-24769 [1997]
20. Mikhailov, O., Queen, J. and Toksoz, M. N. "Using borehole seismic measurements to detect and characterize fractured zones", Geophysics, 65, 1098-1112 [2000]
21. Thomson, A. and Gist, G. "Geophysical applications of electrokinetic conversion", The Leading Edge, 12, 1169-1173 [1993]
22. Kruyt, M. W. "Colloid Science", Elsevier [1952]
23. Dukhin S. S. and Derjaguin, B. V. "Electrokinetic phenomena", in Surface and Colloiid Science, ed. Matijevic, vo. 7, p. [1974]
24. Smoluchowski, M., Bull. Intern. Acad. Sci. Cracovie, p. 184, 1903.
25. Twiny, G. B. and Hoffer, E. "Hyperfiltration by Polyelectrolyte Membranes. 1. Analysis of the Streaming potential", JCIS, 44, 1, 21-36 [1973]
26. Renaud, L., Kleimann, P. and Morin, P. "Zeta potential determination by streaming current modelization and measurement in electrophoretic microfluidic system", Electrophoresis, 25, 123-127
27. Packard, R. G. "Streaming potential across glass capillaries for sinusoidal pressure", J. Chemical Physics, 21, 2, 303-308 [1953]
28. Cooke, C. E. "Study of electrokinetic effects using sinusoidal pressure and voltage", J. Chemical Physics, 23, 12, 2299-2303 [1955]
29. Groves, J. N. and Sears, A. R. "Alternating streaming current measurements", JCIS, 53, 1, 83-89 [1975]
30. Groves, J. N. and Kaplan, J. H. "Electrokinetic streaming current detection", U.S. Pat. No. 3,917,451 [1975].
31. Dukhin, S. S., Shilov, V. N., Mishchuk, N. A. and Kuzmenko, B. B. "Low frequency flow potential", Colloid J. USSR, 46, 4, 659-666 [1984]
32. Dukhin, S. S., Mishchuk, N. A., Kuzmenko, B. B. and Ilin, B. I., "Streaming current/potential in high frequency acoustic field", Colloid J. USSR, 45, 5, 875-881 [1983]

We claim:

1. A method of determining pore size of porous material comprising the steps of:
    selecting a liquid based on a condition that an ionic strength of the liquid determines the thickness of double layers on surfaces of pores of a first material with a known pore size being larger than a largest expected pore size, for allowing an assumption of a complete overlap of double layers for describing an electric field structure inside of the pores;
    saturating the first porous material with the liquid;
    applying at least one of ultrasound or electric field at a single or multiple frequencies;
    measuring seismoelectric or electroseismic current in the first porous material;
    saturating a second porous material with an unknown pore size with the liquid;
    applying at least one of ultrasound or electric field at a single or multiple frequencies to the second porous material;
    measuring either seismoelectric or electroseismic current in the second porous material;
    calculating the pore size of the second porous material using the measurement of the first material as a calibration standard.

2. A method of determining zeta potential of porous material comprising the steps of:
    selecting a liquid based on a condition that an ionic strength of the liquid determines the thickness of double layers on surfaces pores of a porous material with a known pore size being smaller than the smallest expected pore size, for eliminating dependence of a measured seismoelectric or electroseismic signal on geometric properties of porous space;
    saturating the porous material with the liquid and applying at least one of ultrasound or electric field at a single or multiple frequencies;
    measuring seismoelectric or electroseismic current in the porous material for the porous material;
    calculating zeta potential from the measured current using Smoluchowski type theory and a known value of porosity of the porous material.

3. A method of determining iso-electric point potential of porous material comprising the steps of:

modifying chemical composition of a liquid for saturating porous material by incremental addition of chemical that affects zeta potential;

allowing equilibration of the porous material after, each incremental addition;

after equilibration of the porous material, measuring magnitude and phase of the seismoelectric or electroseismic current in the porous material with thin double layers for a single or multiple frequencies after each incremental addition;

determining an iso-electric point of the chemical composition at which a phase of the measured current rotates approximately 180 degrees.

* * * * *